Patented Sept. 13, 1927.

1,641,965

UNITED STATES PATENT OFFICE.

GEORGE HOLLAND ELLIS, OF SPONDON, NEAR DERBY, ENGLAND, ASSIGNOR TO CELANESE CORPORATION OF AMERICA, A CORPORATION OF DELAWARE.

TREATMENT OF CELLULOSE DERIVATIVES.

No Drawing. Application filed September 27, 1924, Serial No. 740,413, and in Great Britain October 8, 1923.

This invention relates to the dyeing, printing or stencilling of artificial threads, yarns, fabrics, films or other products consisting of or containing cellulose acetate.

According to the present invention I apply for the dyeing, printing or stencilling (hereinafter all included in the term dyeing) of artificial threads, yarns, fabrics, films or other products consisting of or containing cellulosee acetate (all hereinafter included in the expression materials comprising cellulose acetate), vat dyestuffs of the anthraquinone series in the unreduced state in the form of their soluble or more soluble modifications prepared by pretreatment with any suitable solubilizing agents. As solubilizing agents there may especially be employed sulphoricinoleic acid or other sulpho fatty acids, or alkali, ammonium or other salts thereof, or other bodies of oily or fatty characteristics having salt-forming groups or their alkali, ammonium or other salts all of which bodies, including the salts, are hereinafter included in the term body of oily or fatty characteristics, or any other suitable solubilizing agents may be employed.

The vat dyes of the anthraquinone series which may be applied according to the present invention include the various indanthrenes, cibanones, algols, helindone dyes, and other dyestuffs being vat dyes of the anthraquinone series.

The dyestuffs employed should not contain strongly acid or salt-forming groups (hereinafter referred to as strongly acidic groups) such as sulpho groups, as it is found that this reduces the affinity of the cellulose acetate for compounds containing them.

The said vat dyestuffs of the anthraquinone series may be employed alone or together with other dyestuffs or coloring matters.

They may likewise be employed for dyeing "mixed" threads, yarns or fabrics, containing or comprising cellulose acetate associated with cotton, silk, wool, artificial fibres of the cellulose type, or other textile materials, either in similar or different shades.

The following is an example of the manner in which the invention may be performed, it being understood that this is given only by way of illustration and in no way as limitative.

*Example.*

Dyeing of 1% shade with algol pink R on 100 lb. of cellulose acetate yarn. 9 to 10 lb. of 50% aqueous sodium sulpho ricinoleate are heated to about 90° C. 1 lb. of algol pink R is then added, well pasted up, and the heating continued until the requisite degree of solubilization is attained. The resultant mass is then diluted with boiling aqueous soap solution made from 3 lb. of good neutral soap and 8–10 gallons of water. This liquor is well stirred and added to the dyebath containing 300–500 gallons of soft water. Dyeing is then carried on in the customary manner until the desired shade is reached, when the usual rinsing, finishing and drying etc. may follow as desired.

What I claim and desire to secure by Letters Patent is:—

1. Process for dyeing materials comprising cellulose acetate, said process comprising applying to the material a vat dyestuff of the anthraquinone series in the unreduced state, solubilized by pretreatment with a solubilizing agent.

2. Process for dyeing materials comprising cellulose acetate, said process comprising applying to the material an unreduced vat dyestuff of the anthraquinone series not containing strongly acidic groups, said dyestuff being solubilized by pretreatment with a solubilizing agent.

3. Process for dyeing materials comprising cellulose acetate, said process comprising applying to the material a vat dyestuff of the anthraquinone series in the unreduced state, solubilized by pretreatment with a solubilizing agent comprising a body of oily or fatty characteristics.

4. Process for dyeing materials comprising cellulose acetate, said process comprising applying to the material an unreduced vat dyestuff of the anthraquinone series not containing strongly acidic groups, said dyestuffs being solubilized by pretreatment with a solubilizing agent comprising a body of oily or fatty characteristics.

5. Process for dyeing materials comprising cellulose acetate, said process comprising applying to the material a vat dyestuff of the anthraquinone series in the unreduced state, solubilized by pretreatment with sodium sulphoricinoleate.

6. Process for dyeing materials comprising cellulose acetate, said process comprising applying to the material an unreduced vat dyestuff of the anthraquinone series not containing strongly acidic groups, said dyestuff being solubilized by pretreatment with sodium sulphoricinoleate.

In testimony whereof I have hereunto subscribed my name.

GEORGE HOLLAND ELLIS.